US007180646B2

(12) United States Patent
Bell et al.

(10) Patent No.: US 7,180,646 B2
(45) Date of Patent: Feb. 20, 2007

(54) HIGH EFFICIENCY MICRO-DISPLAY SYSTEM

(75) Inventors: Cynthia S. Bell, Chandler, AZ (US); Kenneth E. Salsman, Pleasanton, CA (US); Henning Braunisch, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/815,412

(22) Filed: Mar. 31, 2004

(65) Prior Publication Data

US 2005/0225824 A1    Oct. 13, 2005

(51) Int. Cl.
G02B 26/00    (2006.01)
(52) U.S. Cl. ...................................... 359/237
(58) Field of Classification Search ............... 359/237, 359/245, 254, 290, 291, 618
See application file for complete search history.

(56) References Cited

U.S. PATENT DOCUMENTS

| | | | | |
|---|---|---|---|---|
| 6,288,824 | B1 * | 9/2001 | Kastalsky | 359/254 |
| 6,671,078 | B2 * | 12/2003 | Flanders et al. | 359/254 |
| 6,795,249 | B2 * | 9/2004 | Shioya | 359/618 |
| 6,816,714 | B2 * | 11/2004 | Toncich | 455/107 |
| 2002/0114058 | A1 | 8/2002 | DeReus et al. | |

FOREIGN PATENT DOCUMENTS

| EP | 1202096 | 5/2002 |
|---|---|---|
| JP | 10039239 | 2/1998 |
| JP | 11311746 | 11/1999 |
| JP | 2001281567 | 10/2001 |

OTHER PUBLICATIONS

Perregaux et al., "Arrays of Addressable High-Speed Optical Microshutters", 0-7803-5998-4/01 @ IEEE 2001, pp. 232-235.
Jaecklin et al., "Optical Microshutters and Torsional Micromirrors for Light Modulator Arrays", 0-7803-0957-2/93 @ 1993 IEEE, pp. 124-127.
Poisel et al., "Trends in Polymer Optical Fibers", POF-AC, University of Applied Sciences Nuernberg, Germany, 7 pages.
Lau K.Y., "MEM'S The Word For Optical Beam Manipulation", IEEE Circuits and Devices Magazine, IEEE Inc., New York, US, vol. 13, No. 4, Jul. 1997, pp. 11-18, XP000831634, ISSN: 8755-3996 Figure A.
EPO Search Report, PCT/US2005/010499, Filed Mar. 29, 2005, In the Name of Intel Corporation.

* cited by examiner

*Primary Examiner*—Hung Xuan Dang
*Assistant Examiner*—Tuyen Tra
(74) *Attorney, Agent, or Firm*—Blakely, Sokoloff, Taylor & Zafman LLP

(57) ABSTRACT

Micro-displays used for front or rear projection systems as well as near-eye viewing systems may be enhanced using embodiments of the present invention. In one embodiment, the invention may include an array of micromechanical optical modulators, an electronic control system for operating the optical modulators in accordance with a received video signal, and an overlayer for the array of modulators to modify the fill factor for incident light on the array of modulators, the incident light corresponding to at least one color constituent of a video signal.

30 Claims, 5 Drawing Sheets

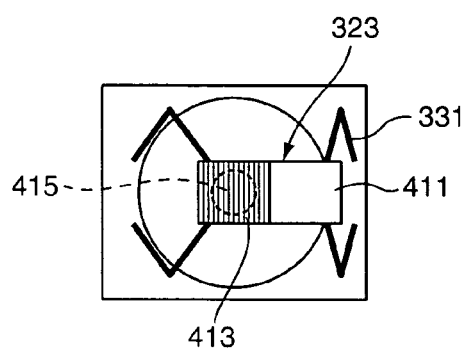
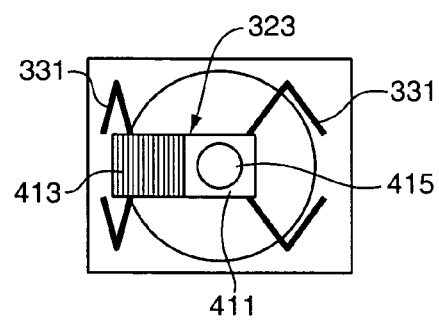
FIG. 4A  FIG. 4B
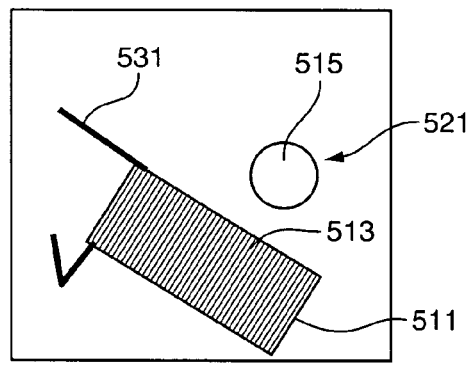
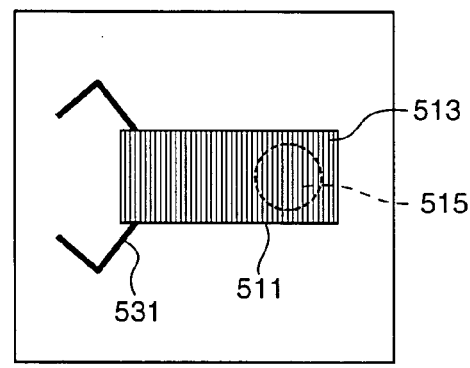
FIG. 5A  FIG. 5B

HIGH EFFICIENCY MICRO-DISPLAY SYSTEM

BACKGROUND

1. Field

Embodiments of the present invention are related to the field of modulators for video displays and, in particular, to micro-mechanical light modulator systems for visible light in projection and virtual projection systems.

2. Background

For video projection systems, there are currently two favored micro-display technologies that are growing in use, LCOS (Liquid Crystal on Silicon) and DMD (Digital Micromirror Display). Both technologies can be constructed primarily using silicon IC (Integrated Circuit) fabrication methodologies. Both technologies provide very small displays with very large numbers of pixels and have been successfully demonstrated to generate very large high definition displays. The displays can be rendered on front projection and rear projection screens as well as in virtual projectors which create the perception of a large image projected at a comfortable distance.

LCOS micro-displays are primarily reflective and operate by rotating the polarization of incident light. By illuminating the display with light of one polarization, and then filtering out that polarization from the projected light, an image is produced from the remaining unfiltered light. The requirements for strict polarization control add to the cost of LCOS based systems and reduce the brightness of the resulting projection system. Grayscale in LCOS panels is most commonly realized by varying the analog voltage in proportion to the desired gray level. Alternatively, some systems realize grayscale digitally by varying the proportion of time a pixel spends in the two polarization states. The latter method is referred to as duty cycle control or pulse width modulation control.

Transmissive and reflective LCDs (Liquid Crystal Display) are also commonly used in video projection systems. They can be made to either allow or block all light or to rotate the polarization of incident light. LCD displays require unique fabrication methodologies, have a slower reaction time, and cannot achieve the fill factor possible with displays built on a semiconductor backplane. While many projector systems use three display panels or CRTs, one for each of red, green, and blue, a projector system that uses a single panel sequentially for all three color components is smaller, lighter, and lower cost than a three-panel system. However, with video frame rates of 60 Hz, the slow reaction time of LCD technologies limits their usefulness in single-panel systems.

DMD micro-displays use a MEMS (Micro-Electro-Mechanical System) transducer in the form of a hinged micromirror. Light impinging on the micro-mirror is directed either into the collection field of a projection lens or to a light scavenger. As with some LCOS micro-displays, video grayscale is accomplished by varying the dwell time that light is directed into the projection lens collection field. The DMD micro-display does not rely on polarization effects to produce an image, so the losses and expenses of polarization-controlling systems are avoided.

In a DMD micro-display some portion of the surface is not covered by the mirror, these include the divots associated with the support pads for each mirror and areas between the mirrors. Incident light hitting these surfaces is partially absorbed and partially scattered, reducing brightness and contrast. In addition, any deviation in the angles of the mirrors also reduces the brightness of any off-angle pixel and reduces the brightness uniformity of the display panel.

The mechanical design of a DMD micro-display further requires a certain amount of inter-pixel spacing between the mirrors to support the electromechanical actuators and to accommodate the tilting of the mirrors. This spacing cannot be reduced easily, even when the size of the mirrors is reduced. As a result, if the micro-display is reduced in size beyond some level, the brightness and contrast of the display may be significantly reduced.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only. In the drawings:

FIGS. 4A and 4B show an active surface and actuator in ON and OFF states, respectively, according to an embodiment of the invention;

FIGS. 5A and 5B show an active surface and actuator in ON and OFF states, respectively, according to another embodiment of the invention;

DETAILED DESCRIPTION

Figure 1:
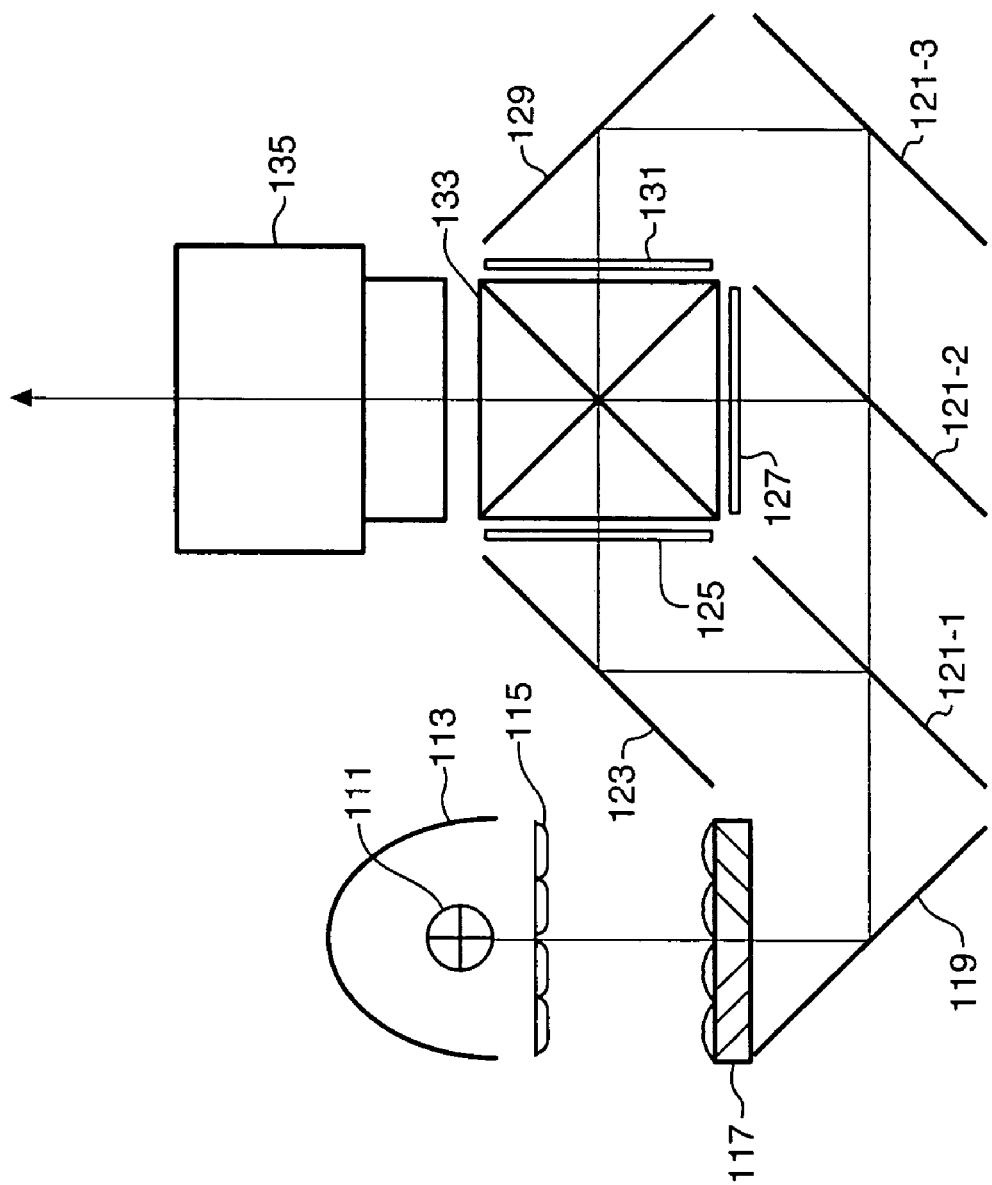
FIG. 1 is a simplified diagram of a front projection system using three transmissive displays.

There are many different projection systems in use for different types of reflective and transmissive displays. The particular design of the projection system will depend upon the application, the desired brightness, packaging considerations and the nature of the signals to be projected. Variations are also made to accommodate front or rear projection and to accommodate large screen and near-eye displays. In FIG. 1, a projection system suitable for use with transmissive LCD micro-displays is shown.

The basic projection system of FIG. 1 has a lamp, such as a xenon lamp 111 surrounded by a reflector 113 that projects the light from the lamp into a collimator 115. The particular design of the light engine will vary with differences in lamps and with form factor considerations. Recently, LEDs and other light sources have been proposed which would result in significant differences in the form of the light engine.

The light from the collimator is directed toward a PCS (Polarization Conversion System) 117 which converts the light to exhibit a single polarization state and an attached fold mirror 119, included for packaging considerations. The mirror 119 may also reflect only the visible portion of the light spectrum, allowing heat to be directed out of the image-forming path. The polarized light is directed to a set of three dichroic color filter plates 121-1, 121-2, and 121-3 one for each of the red green and blue colors, respectively. The red light is directed by a red mirror 123 to a transmissive red micro-display 125. The green light is reflected directly to a green micro-display 127 and the blue light is directed by a blue mirror 129 to a blue micro-display 131.

Each transmissive micro-display alters the polarization state of the impinging light so that pixels that are dark in the respective color are altered differently than pixels that are bright in the respective color. Both normally bright and normally dark systems have been used. Different levels of brightness are provided by controlling either the analog drive voltage or the duration of the polarization altering state at each pixel. One light modulator capable of performing such a function is a transmissive LCD display. In the transmissive LCD, incident illumination of one polarization is either allowed to remain in or is rotated to the S-polarization state to create a bright pixel. When a dark pixel level is desired, the incident illumination is either allowed to remain in or is rotated to the P-polarization state.

The majority of incident illumination passes through the transmissive panel and is analyzed by the color recombiner cube. If the polarization state from a pixel is in the S-polarization state, it is directed into the projection lens. If the polarization state from a pixel is in the P-polarization state, it passes straight through the color recombiner cube and is reflected back toward the illumination optics. Since all of the light incident on each panel is polarized, the polarization-dependent effect of the LCD may be exploited. For other micro-displays which do not rely on polarization states, the PCS may be avoided and the brightness of the projection system accordingly enhanced.

After passing through each micro-display, the colors are recombined in an appropriate prism 133 and directed to a projection lens 135 which relays the image to a projection screen. Various components of the projection system may be altered or removed to accommodate different applications and different types of micro-displays. For example, for a single-panel micro-display, a color wheel or color valve may be used in the main light path instead of the dichroic filters and recombining prism. In addition, many components that otherwise might be included are not shown for simplicity. For example, additional analyzers and compensating optics would likely be included in many projection systems. The system also requires control electronics to operate the micro-displays and other components of the system.

Figure 2:
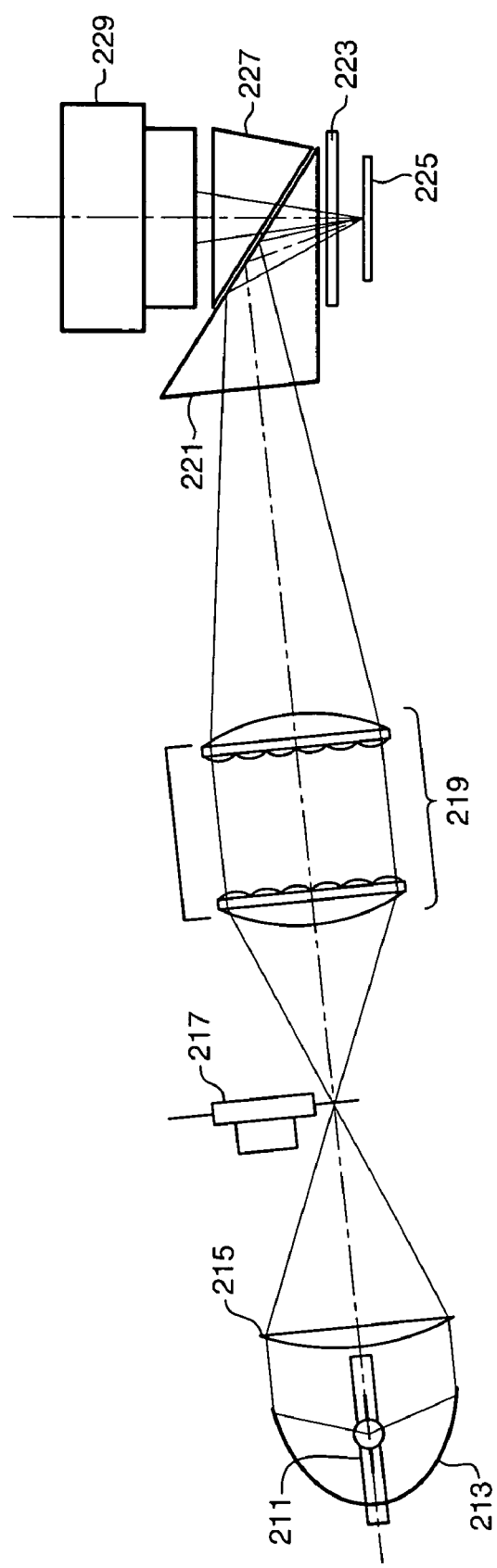
FIG. 2 is a simplified block diagram of a front projection system using a single reflective display.

FIG. 2 shows a projection system suitable for single-panel reflective micro-displays, such as DMD micro-displays. The light engine, similar to the system of FIG. 1, includes a lamp 211, such as a xenon lamp, and a reflector 213 to direct light through a converging lens 215. The converging lens directs the light through a color wheel 217 and to an integrating optical system 219. The color wheel may be a rotating wheel, a modulated color selective panel, or any of a variety of other color modulators.

From the integrating optics, the light is directed to a prism 221 that uses TIR (Total Internal Reflection) to direct the light through a protective glass shield 223 toward the reflective micro-display 225. While the illustrated projection system is optimized for use with a DMD micro-display, other displays may alternatively be used. For example, by adding polarizers and modifying the prism, an LCOS display may be used.

Light reflected from the DMD is directed back toward the prism. Incident light that strikes a flat micro-mirror corresponding to the ON state strikes the back surface of the prism at an angle greater than the critical angle for TIR and is transmitted through the prism to a final prism 227 and to a projection lens 229. Light that strikes a micro-mirror that has been tilted to the OFF state strikes the back face of the prism at less than the critical angle and is reflected back toward the light engine. As with the system in FIG. 1, many variations and modifications are possible and the drawing has been simplified so that not all required components are shown.

Figure 3A:
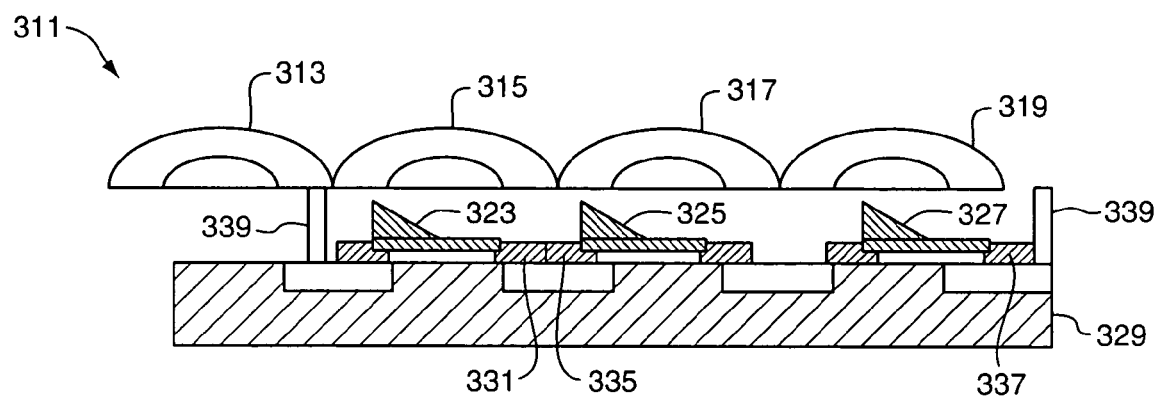
FIG. 3A shows a micro-display and micro-lens array combination according to an embodiment of the invention.

FIG. 3A shows an example of a pixelated light modulator and micro-lens system. A micro-lens array 311 is made up of many individual micro-lenses 313, 315, 317, 319. In many embodiments, the micro-lenses make up a two dimensional grid with hundreds of micro-lenses in each direction. Each micro-lens corresponds to a particular pixel, so for a 1080i HDTV (High Definition Television) display, there may be 1920 columns of micro-lenses in each of 1080 rows of micro-lenses. This creates an overlayer proximate a corresponding array of MEMS light modulators.

Each micro-lens is associated with a corresponding MEMS actuator 323, 325, 327. There may be the same number of actuators as there are micro-lenses. The actuators are formed on a MEMS substrate, such as a silicon substrate that carries the structural foundation and a drive circuit 331, 335, 337 for each actuator. The substrate may also carry the control electronics (not shown) for each actuator together with video translation or other control circuitry (not shown). Alternatively, all of the control circuitry may be carried on another device.

Referring to the three actuators shown in FIG. 3A, the left-most actuator 323 will be illuminated by light passing through the micro-lens 315 directly above it. This light will strike the flat portion of the actuator and be reflected directly back toward the micro-lens. In one embodiment, this angle will direct the reflected light back toward the light source where it may be recycled. In another embodiment, this light is absorbed. The center actuator 325 is shown in a similar position. These two actuators correspond to dark pixels or a dark state for the corresponding pixels. The right-most actuator 327, however, is in a bright state. Light from the micro-lens 319 will strike the angled wedge portion of the actuator and be reflected at an angle. In one embodiment, this angle will direct the reflected light directly or indirectly into the collection field of the projector lens.

One example of a MEMS actuator of FIG. 3A is shown in FIGS. 4A and 4B. In FIG. 4A the actuator 4A has an active surface with two portions 415, 411. The portion shown on the left in FIGS. 4A and 4B corresponds to the wedge shaped element on the left of each actuator as shown in FIG. 3A. The portion shown on the right in FIGS. 4A and 4B corresponds to the flat element shown on the right of each actuator in FIG. 3A. In one embodiment, both portions are reflective and the actuator has two states.

In the ON state shown in FIG. 4A, incident light 413 is directed toward the wedge portion of the active surface. Using the angle of the wedge portion this incident light is reflected off the optical axis of the micro-lens (to the side) and into the collection field angle of the projection lens. The projection system may be designed so that this light is directed to a projection lens for a front or rear projection screen.

In the OFF state shown in FIG. 4B, the incident light spot beam 413 strikes the flat portion of the active surface and is reflected on-axis, away from the collection field of the projection lens. This reflected light may be absorbed or scavenged for other purposes. Accordingly, a MEMS actuator as shown in FIG. 3A may be applied to wide range of different display system including near-eye and direct view projectors as well as projectors of the type shown in FIG. 2.

As an alternative, the system optical design may be reversed, so that on-axis light corresponds to the ON state and off-axis light corresponds to the OFF state. It is desirable to design the MEMS actuator so that a fabrication flaw which may leave a pixel inoperable results in a dark state pixel in the final projection system. Dead dark pixels are tolerable in display systems while dead bright pixels are not.

In the illustrated example, the MEMS transducer is a laterally moving metallized, e.g. aluminum coated, element. The reflective surface may be formed using an aluminum coating or using any other suitable reflective material or treatment. The particular choice will depend on the application and the nature of the light to be reflected. The two portions may be reflective, transmissive, polarization altering, deflecting or treated with any other type of optical surfacing or substances that allows the two portions to be distinguished by the system optics.

The active surface is moved by a quad hinge structure although many other structures may be used that generate a lateral translation of a primarily flat element. These include miniature solenoid pin structures and translating beams. Many different mechanical and electro-mechanical structures may be formed using MEMS processing techniques. Many such structures may be designed to accommodate any particular voltage. Accordingly, as voltage requirements for integrated circuitry change, corresponding MEMS structures with the same power source may be redesigned to accommodate the new voltage.

Figure 3B:
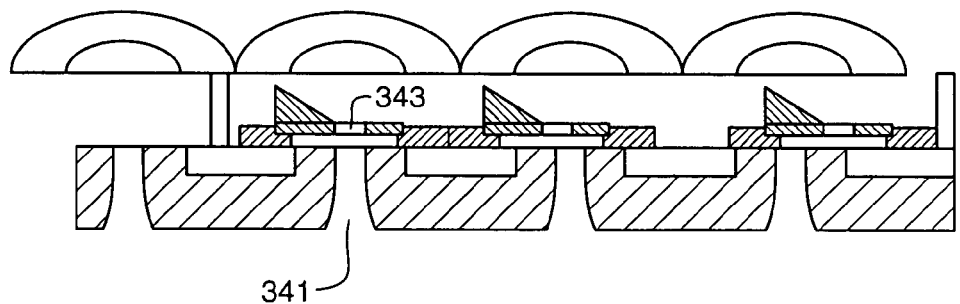
FIG. 3B shows a micro-display and micro-lens array combination with through holes according to an embodiment of the invention.

In FIG. 3B the structure has been adapted to act either as a transmissive display or to provide an alternate path for light that is not to be collected at the projector lens. In FIG. 3B, the same reference numbers are used to designate substantially the same elements. A micro-lens 313, 315, 317, 319 is positioned over each actuator 323, 325, 327, and the micro-lens array is fixed in position over the actuators by post spacers 339. Each actuator has an active surface with a first position and a second position.

The silicon substrate 329 of FIG. 3B has an array of through holes 341. The holes extend completely though the silicon substrate so that light may be transmitted through each hole. The through holes may be voids where material has been etched or machined away from the substrate or they may be optical holes, transparent to light of the relevant wavelength but filled or formed of an otherwise solid or substantial material. Each through hole is aligned with an actuator and each actuator similarly contains a hole or transparent portion 343, so that light that is incident on the transparent portion of the actuator will pass completely or to a great extent through the substrate.

In the example shown in FIG. 3B, the transparent portion of the actuator is aligned in the OFF state with the transparent though hole of the substrate. As a result, when the actuator is moved to the OFF state, the incident light will pass through the actuator and the substrate away from the projection lens and the light source. Passing the light through the substrate allows stray light to easily be eliminated from the system in the OFF state. This enhances contrast.

Referring to the three actuators shown in FIG. 3B, the left-most actuator will be illuminated by light passing through the micro-lens directly above it. This light will strike the flat portion of the actuator and be transmitted through the substrate. In the embodiment described above, this will transmit the light to a place where it will be absorbed. The center actuator is shown in a similar position. These two actuators correspond to dark pixels or a dark state for the corresponding pixels. The right-most actuator, however, is in a bright state. Light from the micro-lens will strike the angled wedge portion of the actuator and be reflected at an angle corresponding to the collection field of the projector lens.

Alternatively, the micro-display of FIG. 3B may be used as a transmissive micro-display. In the OFF state, the actuator may be moved to reflect light on or off axis back toward the light source. In the ON state, the actuator may be moved to allow incident light to pass through the substrate to the other side. Corresponding adjustments may be made to the optical system so that the projector lens is moved to the opposite side of the micro-display from the micro-lens array. In some embodiments an additional micro-lens display may be added to the opposite side of the substrate to enhance the projected image.

With a perforated substrate, as described above, the two portions of the active surface of each actuator may be flat and on the same plane. Because one portion is reflective and the other portion is transmissive the ON and OFF states are clearly distinguished and the resulting light paths may be separated. Alternatively, any type of surfacing may be applied to either portion to meet conditions of a particular application. Accordingly, a MEMS actuator as shown in FIG. 3B may be applied to a wide range of different display systems including near-eye and direct view projectors as well as projectors of the type shown in FIGS. 1 and 2.

The micro-lens array may be formed in any of a variety of ways. According to one embodiment, it is formed on a planar quartz substrate using processes similar to those used for semiconductor processing. The lens forms are patterned and reflowed from one or more layers of lens material. The lens arrays of FIGS. 3A and 3B are formed by stacking two layers to achieve more optical power in the lenses. The lenses may also be formed, for example, using molding, machining and etching or finished lens molding techniques.

In one example, each micro-lens is designed to focus an image circle of the incident light at a point just past the active surface of the actuator. This prevents a sharply focused image of the active surface from appearing in the projected image and reduces surface planarity requirements for the actuator's active surface. The image circle is slightly smaller than the active surface, so that the incident light does not strike any inactive portions of the actuator.

In one embodiment, the micro-lens array features an array of plano-convex singlets with centers 9 µm apart and the lenses are spaced 5 µm from the active surfaces of the actuators. The incident image circle created by each lens is 1.2 µm in diameter and the image circle is focused at a point 1.2 µm past the actuator surface. Micro-lenses corresponding to these criteria with an F/number of 1.26 may be formed out of PMMA (polymethylmethacrylate) on a clear quartz substrate using spin-on resist equipment or from other materials by CVD (Chemical Vapor Deposition). As mentioned above, various optical surfaces or lenses may be formed on the actuator active surfaces to provide additional benefits.

While conventional spherical plano-convex lenses are shown, beneficial light concentrating and focusing benefits of the lens array may be achieved with a variety of different optical elements. Such elements may include aspheres, DOEs (Diffractive Optical Elements), Fresnel surfaces, GRIN (Gradient Index) lenses and other optical elements. The array may be formed as shown as an overlayer with optical elements applied, or as a single substrate that has been formed to create the desired optical element.

The posts shown in FIGS. 3A and 3B may be fabricated of any of a variety of different materials suitable for the fabrication process and the expected operational temperatures of the device. The illustrated posts establish a well-defined air gap between the micro-lenses and the mechanical actuators which aids optical performance for the lenses and protects the mechanical actuators. The particular distance between the micro-lenses and the actuators may be determined based on the dimensions of the actuators and the performance of the optical elements. The post structure is shown for ease of understanding and different structures may be used to suit mechanical design considerations of a particular application.

As a further alternative to the post and separate quartz sheet structure shown, the array of optical elements may be formed directly on the silicon substrate. Spacer or filler materials may be applied to maintain an appropriate distance from each actuator and appropriate optical elements may be formed directly over the spacer or filler structures. The optical element array may also be a separate structure that is not directly attached to the MEMS structure. The relative positions of the two parts may be maintained by some exterior framework or housing.

The micro-lens array may be designed to concentrate impinging light into a portion of each pixel so that the remaining area of each pixel may be used for MEMS and circuit support. This design may improve performance for existing LCOS and DMD systems. This also improves the fill factor for each resulting pixel.

The fill factor may be viewed as a representation of the proportion of the incident light that impinges upon the active portions of the display. There are several different measurements of fill factors. One measurement compares the amount of active area to the amount of inactive or inter-pixel area. This measurement assumes uniform illumination on the micro-display. A more useful measurement may be to compare the brightness of the light that is incident on the micro-display to the brightness of the light reflected/transmitted by the micro-display in a full reflective/transmissive mode. This measurement includes attenuation effects of imperfect mirrors, analyzers, protective sheets, etc.

By concentrating the light into a smaller spot, each MEMS actuator may also be designed to use a smaller range of motion than would otherwise be required. The MEMS actuator's smaller range of motion enables it to change the pixel's brightness more rapidly. This may be useful for single-chip light modulators that must time deliver full tonal range in red, green and blue image fields during a 1/60 second frame of time.

FIG. 5A shows an alternative actuator design. In the embodiment diagrammed in FIG. 5A, the active surface 511 of the actuator 513 carries only half of the quad hinge mechanism. Both hinges are on the same side and operate independently so that the actuator swings through a partial arc about a remote pivot point (not shown). This movement may be obtained with either one or both hinge elements being operated.

In FIG. 5A, one hinge element is retracted and the other is extended so that the actuator's active surface is pulled to one side. The focused spot of light 515 from the corresponding micro-lens is incident on the substrate. This light will either be reflected, if this portion of the substrate is mirrored, transmitted, if this portion of the substrate is transparent or a through hole, absorbed, if this portion of the substrate is absorptive in the relevant portion of the light spectrum, or deflected, if this portion of the substrate is angled or optically treated. There are other possible treatments for this portion of the substrate and the best choice will depend on the particular application. The active surface of the actuator is not used in FIG. 5A.

In FIG. 5B the hinges have moved to an intermediate position to place the active surface 511 of the actuator 513 directly in the path of the spot of incident light 515. This prevents the light from hitting the substrate, so the light path will instead be determined by the treatment that has been applied to the active surface of the actuator. This surface may be planar or wedge-shaped, among others. It may by absorptive or reflective. In one embodiment, both surfaces are reflective but are pitched at different angles. As a result, incident light will be directed at different angles, depending on the position of the actuator. This creates an effect similar to the wedge shaped actuator of FIG. 3A. Accordingly, a MEMS actuator as shown in FIGS. 5A and 5B may be applied to a wide range of different display systems including near-eye and direct view projectors as well as projectors of the type shown in FIGS. 1 and 2.

The support and translation constraining mechanism illustrated in FIGS. 4A, 4B, 5A, and 5B are quad hinge structures, but many other structures may alternatively be applied to this concept. In FIGS. 5A and 5B, since the transducer is dually hinged along one end only, the actuator swings through an arc when actuated. This allows it to be positioned in or away from the lenslet focal point. In another embodiment, the translating member may have an integral hinge so that it can be driven to lie flat or bend upward. In this way, it would form an angle through the lens focal point and function much like the wedge of FIGS. 3A and 3B.

The particular surface treatment to be applied to any of the active surfaces or portions of surfaces described herein may be adapted to suit any particular application. The specific examples provided are intended to serve as examples of possible approaches. Many other alternatives are possible. In addition, as mentioned above, any of the active surfaces may be treated with filtering or powered surfaces to alter the color, tone (grayscale) level, or polarization axis of the exiting beam. In systems where more separation is desired between reflective and non-reflective beam angles, the wedge may be replaced with elements having optical power, such as a mirror or Fresnel lens. These may be used to refocus and redirect the reflected light beam with more design flexibility than a flat mirror surface.

Figure 6:
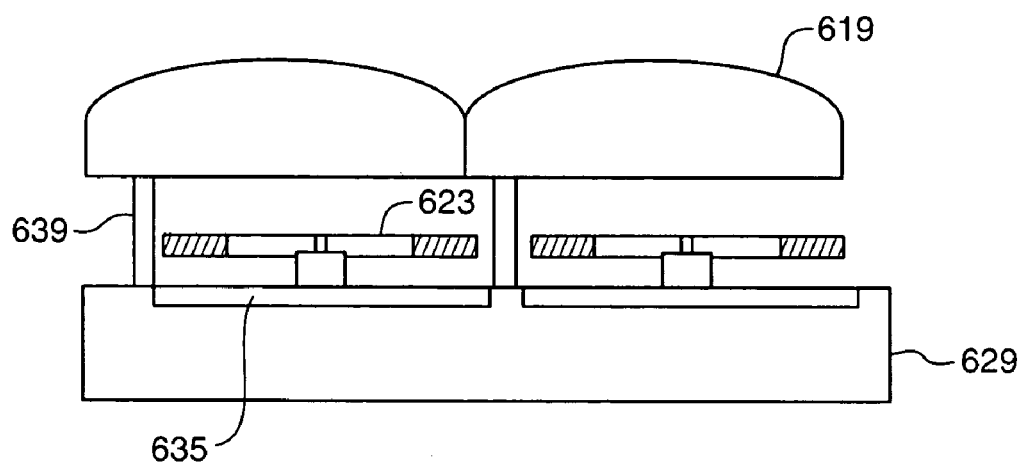
FIG. 6 shows a micro-display and micro-lens array combination according to another embodiment of the invention.

Referring to FIG. 6, a different type of actuator 623 is formed on a substrate 629. This actuator is in the form of a spinning wheel and is driven by a commutator drive circuit 635 in the substrate. The substrate also carries post spacers 639 to maintain a proper distance between the actuator array and an optical overlayer 619. Many of the variations and modifications described above may be applied to the embodiment of FIG. 6. The optical overlayer may be formed as a micro-lens array in a manner similar to that of FIGS. 3A and 3B.

Figure 7A:
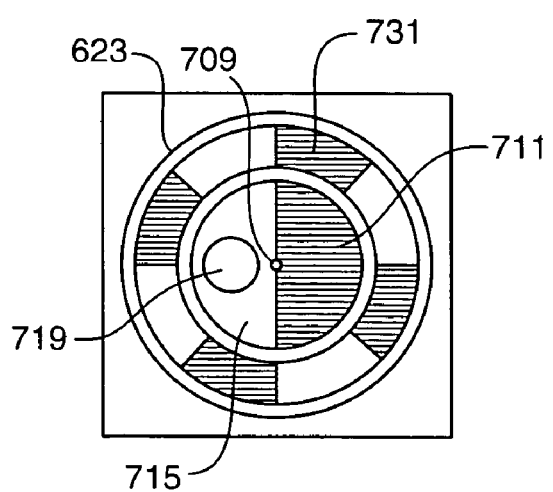
FIGS. 7A and 7B show an active surface and actuator in two and four segment versions, respectively, according to a third embodiment of the invention.

As shown in FIG. 7A, the rotating actuator may also carry an active surface with two portions 711, 715. The wheel, driven by stators 731 on an inner or outer ring, may be precisely positioned in the manner of a stepper motor so that an appropriate one of either the first portion or the second portion of the active surface intercepts the incident light beam for the desired amount of time. The two portions may be reflective, transmissive, polarization altering, deflecting or treated with any other type of optical surfacing or substances that allows the two portions to be distinguished by the system optics.

Rather than a translating rectangular MEMS actuator as shown in FIG. 3A, in FIG. 6, the various light path control variations noted above are mounted on a disc and made to pass through the light spot 719 by rotating the disc about its central axis 709. This axis may include an axle as shown, or the disc may be held in place in any other way. The disc has an active surface which covers almost the entire disc surface in the illustrated embodiments. The active surface contains different portions (two or four in the illustrated embodiments) that may have two or more light control elements on their surfaces. In FIG. 7A, there are two light control elements 711, 715, while in FIG. 7B there are four light control elements on the disc 721, 723, 725, 727.

These light control elements may be treated also to control color. So, for example in the example of FIG. 7A, three of the light control elements may be treated with a color control element to transmit or reflect only one band of color. One element may reflect only red, another green and the third blue. The fourth element may be a dark element for reflecting no color or reflecting the undesired colors out of the collection axis of the projector lens.

Figure 7B:
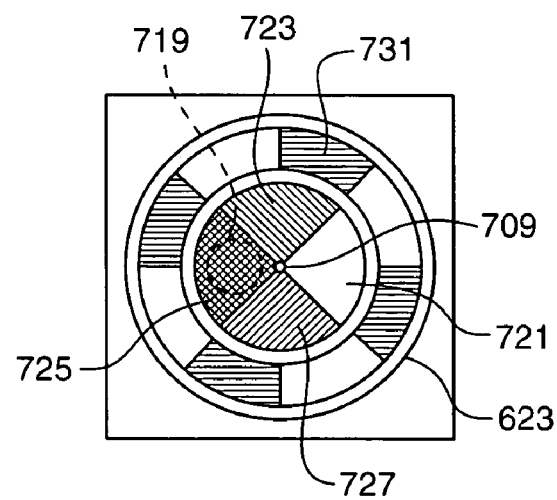

In one embodiment, each disc is formed from a transparent material and a different dichroic film is applied to each portion of the disc. Light of the desired color that is not reflected passes through the disc to be transmitted or reflected off-axis. Using this approach, each disc functions as a color wheel as well as a light modulator. By shining white light onto each wheel the brightness of each constituent color at each pixel element may be controlled by accurately positioning each wheel in the proper positions for the proper amount of time for each frame. Accordingly, a MEMS actuator as shown in FIGS. 7A and 7B may be applied to a wide range of different display systems including near-eye and direct view projectors as well as projectors of the type shown in FIG. 2.

Modifications and variations may be made to any of the drive circuits described herein. While a quad hinge or commutator and stator may work well for some applications, other drive circuits may also be used. Possible drive circuits may include capacitive electrostatic coupling, electromagnetic force, etc.

In the present description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a video projector, the apparatus described herein are equally applicable to any type of illumination system for a display, whether for projection or direct viewing, whether near-eye or not. For example, the techniques described herein are thought to be useful in connection with computer and data device displays, television and movie projectors, internet appliance viewers, and entertainment systems for video and game playing.

In the foregoing specification specific embodiments of the present invention have been described. It will, however, be evident that various modifications and changes may be made thereto without departing from the broader spirit and scope. The specification and drawings are, accordingly, to be regarded in an illustrative rather than a restrictive sense.

What is claimed is:

1. An apparatus comprising:
   a substrate having an array of through holes, the through holes being transparent to visible light;
   an array of micromechanical optical modulators on the substrate, each optical modulator being proximate a respective one of the through holes, each modulator having a first position to allow incident visible light to pass through the respective through hole and a second position to prevent incident visible light from passing through the respective through hole, the incident light corresponding to at least one color constituent of a video signal;
   an electronic control system for operating the optical modulators in accordance with a received video signal;
   an optical overlayer proximate the array of optical modulators to direct incident light to a respective one of the through holes.

2. The apparatus of claim 1, wherein each optical modulator comprises a transparent portion and an opaque portion and wherein the incident light is incident on the transparent portion in the first position and the incident light is incident on the opaque portion in the second position.

3. The apparatus of claim 1, wherein each optical modulator comprises an opaque portion and wherein the incident light is not incident on the optical modulator in the first position and the incident light is incident on the opaque portion in the second position.

4. The apparatus of claim 3, wherein the opaque portion is reflective.

5. An apparatus of claim 4, wherein the second portion comprises an angled mirrored surface to reflect incident light away from the direction from which it came.

6. The apparatus of claim 1, wherein the optical overlayer comprises an array of micro-lenses.

7. An apparatus of claim 1, wherein the overlayer comprises an array of optical elements proximate the array of optical modulators, and positioned such that each optical element of the array directs incident light on a respective one of the optical modulators of the array.

8. The apparatus of claim 7, wherein the optical elements comprise piano-convex micro-lenses formed on a transparent sheet.

9. An apparatus of claim 1, wherein each optical modulator of the array has an optical section and a mechanical section and wherein the overlayer directs incident light on a respective optical section and reduces incident light on the corresponding mechanical section.

10. The apparatus of claim 9, wherein the overlayer focuses the light at a location proximate the respective optical section.

11. The apparatus of claim 1, further comprising a post to position the overlayer at a fixed distance from the array of micromechanical optical modulators.

12. An apparatus comprising:
    an array of active surfaces, each having a first portion corresponding to an ON state and a second portion corresponding to an OFF state, the second portion comprising an angled mirrored surface to reflect incident light away from the direction from which it came; and
    an array of electromechanical actuators, each corresponding to one of the active surfaces, to translate the active surface to alternately expose the first portion or the second portion to incident visible light.

13. The apparatus of claim 12, wherein the first portion comprises a substantially flat reflective surface to reflect incident light back in the direction from which it came.

14. The apparatus of claim 12, wherein at least one of the first surface and the second surface comprise a polarization-altering element.

15. The apparatus of claim 12, wherein at least one of the first surface and the second surface comprise a powered optical element.

16. The apparatus of claim 12, further comprising a substrate having an array of through holes, each through hole being proximate a respective active surface, the through holes being transparent to visible light, and wherein one of either the first or second portions of the active surface is transparent to visible light to allow the incident light to pass through the respective through hole.

17. The apparatus of claim 12, further comprising an optical overlayer proximate the array of active surfaces to direct incident light to the active surfaces.

18. The apparatus of claim 17, wherein the overlayer comprises an array of optical elements proximate the may of active surfaces, and positioned such that each optical element of the array directs incident light on a respective one of the active surfaces of the array.

19. The apparatus of claim 17, wherein the overlayer focuses the light at a location proximate the respective active surface.

20. An apparatus comprising:
a substrate having an array of through holes through the substrate, the through holes being transparent to visible light;
an array of active surfaces, each active surface corresponding to and being proximate to a trough hole of the array of through holes, the surfaces of the array corresponding to either an ON state or on OFF state with respect to incident visible light; and
an array of electromechanical actuators, each corresponding to a surface of the array, to move the surfaces of the array to alternately cover or uncover a respective through hole of the substrate, the incident light being allowed to pass through the respective through hole when the through bole is uncovered and the incident light striking a surface of the array when the respective through hole is covered,
wherein the array of active surfaces each comprise a first portion to reflect a first color band of visible light and a second portion to reflect a second color band of visible light.

21. The apparatus of claim 20, wherein the surfaces of the array are reflective.

22. The apparatus of claim 20, wherein the surfaces of the array are reflective surfaces and correspond to an ON state and wherein the trough holes correspond to an OFF state.

23. The apparatus of claim 20, wherein the actuators each correspond to a surface of the array, for translating the surfaces to alternately cover or uncover the respective through holes.

24. The apparatus of claim 20, wherein the actuators each correspond to a surface of the array, for rotating the surfaces about a remote pivot point to alternately cover or uncover the respective through holes.

25. The apparatus of claim 20, further comprising an optical overlayer proximate the array of active surface to direct incident light to the active surfaces.

26. The apparatus of claim 20, wherein the surfaces of the array comprise a polarization-altering element.

27. An apparatus comprising:
an array of active surfaces, each having a first portion corresponding to an ON state with respect to incident visible light and a second portion corresponding to an OFF state with respect to incident visible light, the first and second portions being arrayed about a central axis;
an array of electromechanical actuators, each corresponding to one of the active surfaces, for rotating each active surface about its respective central axis to alternately expose the first portion or the second portion to incident visible light; and
a substrate having an array of through holes, each through hole being proximate a respective active surface, the through holes being transparent to visible light, and wherein one of either the first or second portions of the active surfaces is transparent to visible light to allow the incident light to pass through the respective through hole.

28. The apparatus of claim 27, wherein the first portion reflects a first color band of visible light the active surfaces each farther comprising a third portion corresponding to an ON state that reflects a second color band of visible light.

29. The apparatus of claim 27, further comprising an optical overlayer proximate the array of active surfaces in direct incident light to the active surfaces.

30. The apparatus of claim 27, wherein the second portion comprises an angled mirrored surface to reflect incident light away from the direction from which it came.

* * * * *

UNITED STATES PATENT AND TRADEMARK OFFICE
CERTIFICATE OF CORRECTION

PATENT NO.       : 7,180,646 B2
APPLICATION NO.  : 10/815412
DATED            : February 20, 2007
INVENTOR(S)      : Bell et al.

It is certified that error appears in the above-identified patent and that said Letters Patent is hereby corrected as shown below:

In column 11, at line 27, delete "trough" and insert --through--.

In column 11, at line 47, delete "trough" and insert --through--.

Signed and Sealed this

Fourteenth Day of April, 2009

JOHN DOLL
*Acting Director of the United States Patent and Trademark Office*